(12) United States Patent
Sommer et al.

(10) Patent No.: US 6,785,515 B1
(45) Date of Patent: Aug. 31, 2004

(54) METHOD AND SYSTEM FOR TAPPING TELEPHONE CONVERSATIONS

(75) Inventors: Bernd Sommer, Gräfelfing (DE); Ulrich Grote, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/601,277

(22) PCT Filed: Jan. 29, 1999

(86) PCT No.: PCT/DE99/00241
§ 371 (c)(1),
(2), (4) Date: Nov. 13, 2000

(87) PCT Pub. No.: WO99/39492
PCT Pub. Date: Aug. 5, 1999

(30) Foreign Application Priority Data
Jan. 30, 1998 (DE) .......................................... 198 03 763

(51) Int. Cl.[7] .................... H04B 17/00; H04M 11/04; H04M 1/24
(52) U.S. Cl. .................... 455/67.12; 455/403; 455/405; 379/7; 379/35
(58) Field of Search ................................ 455/403, 405, 455/67.12; 379/38, 196–200, 207.01, 7, 35

(56) References Cited

U.S. PATENT DOCUMENTS

| 5,428,667 | A | | 6/1995 | Easterling et al. |
| 5,590,171 | A | | 12/1996 | Howe et al. |
| 5,913,161 | A | * | 6/1999 | Ozulkulu et al. ............ 455/405 |
| 5,937,345 | A | * | 8/1999 | McGowan et al. ......... 455/410 |
| 6,233,313 | B1 | * | 5/2001 | Farris et al. .................. 379/35 |

FOREIGN PATENT DOCUMENTS

| DE | 44 19 040 | 8/1995 |
| WO | WO 97/41678 | 11/1997 |

* cited by examiner

*Primary Examiner*—Vivian Chin
(74) *Attorney, Agent, or Firm*—Young & Thompson

(57) ABSTRACT

A method and a system for monitoring telephone calls are described. A useful signal (which represents the call information of a telephone call) and a data set (which contains at least one digital subscriber tag) are supplied to a recording center (20). The data set is supplied to a relaying device (28), in which it is compared with stored comparison data sets. If the subscriber tag matches a corresponding comparison tag of a selected comparison data set, a communications link is produced to a monitoring device (36).

24 Claims, 1 Drawing Sheet

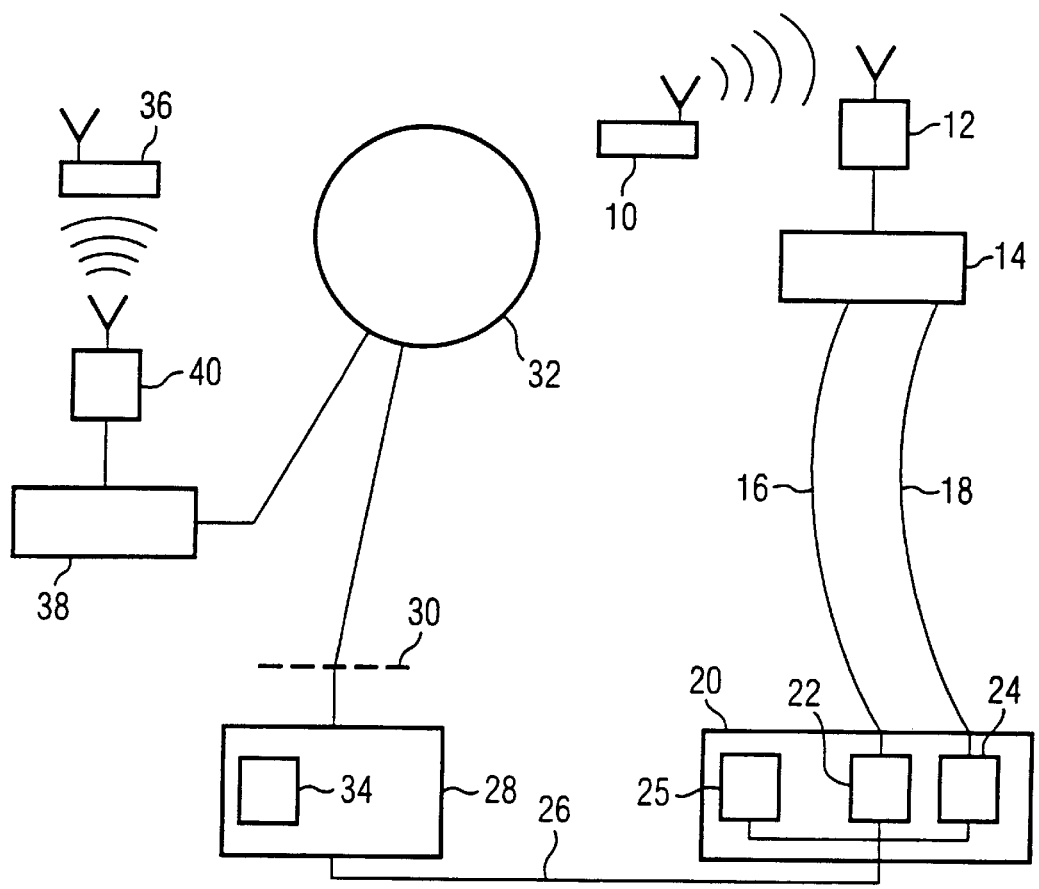

METHOD AND SYSTEM FOR TAPPING TELEPHONE CONVERSATIONS

BACKGROUND OF THE INVENTION

The invention relates to a method and a system for monitoring telephone calls, in which a useful signal (which contains the call information of a telephone call) and a data set (which contains at least one digital subscriber tag) are supplied to a recording centre, and the call information is stored there in the form of digital call data and the data set associated with such call data.

Mobile communication, using radio telephones, which are also called mobile stations in the following text, is playing an increasingly important role in telecommunications. For example, in Europe, a digital mobile communications network has been set up which is based on the GSM Standard. The number of mobile subscribers who use this mobile communications network has been rising at an amazing rate in the recent past.

The enormous progress in the field of mobile communications is now resulting in a situation in which criminals, for example members of organized crime syndicates, are now increasingly using the advantages of this new technology for planning and carrying out their illegal machinations. The investigating authorities are therefore interested, while complying with the legal regulations, in also being able to monitor those telephone calls which a target person who is subject to observation makes via a mobile station.

At the moment, monitoring of telephone calls in the area of the Federal Republic of Germany is controlled by the so-called Telecommunications Monitoring Order, in accordance with which, a telephone call which is to be monitored is recorded in a recording centre which is controlled by an investigating authority. The useful signal, which essentially represents the information content of a telephone call, that is to say which contains the relevant call information, and data which are combined in a data set and are suitable for identifying the target person, that is to say, for example, the international mobile subscriber telephone number of the mobile station used, called MSISDN, for short, are supplied to the recording centre. In the recording centre, the useful signal is stored in the form of digital call data and the data set is stored, so that an authorized person requiring the information, for example a criminal investigator who has the task of monitoring the target person, can monitor the recorded telephone call. At this point, it should be mentioned, that, in the following description, the term "monitoring" should not be understood just to be the assessment of an acoustic signal, but, in general, the reception and evaluation of the call information.

The known monitoring method has the disadvantage that the person who needs to do the monitoring can monitor the call made by the target person only at the location of the recording centre. In particular, it is impossible for him simultaneously to follow and to monitor the target person who, for his part, by using the mobile station during the telephone call, does not need to stay at a fixed location. This considerably limits the efficiency of the monitoring process, and the fight against crime associated with it.

The object of the invention is to specify a method and a system which allow the monitoring of telephone calls, in particular of mobile subscribers to be monitored as well, to be carried out more efficiently.

The invention achieves this object by a method in which the data set is coupled to a fixed network. The data set is compared in the [lacuna] with comparison data sets which each contain at least one comparison tag. If the subscriber tag matches the corresponding comparison tag of a selected comparison data set, a communications link is produced via a fixed network, between a relaying device, which is coupled to the fixed network, and at least one monitoring device, which is intended for monitoring the telephone call.

SUMMARY OF THE INVENTION

The call data stored in the recording centre are supplied to the relaying device. The monitoring device is supplied by the relaying device, and via the communications link, with a relayed signal which contains the call information.

The relaying device which is coupled to the call without any significant time delay. By virtue of the coupling to the fixed network, the relaying device can produce the communications link to the monitoring device directly, and can send the call data requested from the recording centre to the monitoring device in the form of a relayed signal. Irrespective of whether the fixed network is an at least partially analogue telephone network or a digital telephone network, the relayed signal may be an analogue signal or a digital signal. In the latter case, the call data can be passed on from the relaying device essentially unchanged to the monitoring device. The invention thus allows so-called on-line transmission of the telephone call to be monitored, while this telephone call is still taking place.

The relaying device offers the capability to distribute the telephone calls received by the recording centre to individual persons who need to do the monitoring. A person who needs to do the monitoring, for example a criminal investigator entrusted with monitoring the target person, is therefore not forced to monitor the target person from the recording centre, as in the past. Particularly if a mobile station is used as the monitoring device, he can monitor the target person while tracking him, thus making the fight against criminals more effective and more flexible than in the past. Using the mobile station as a monitoring device also offers the person who needs to do the monitoring the advantage of easy handling as well as virtually perfect cover as an innocent mobile subscriber.

The method according to the invention is not limited to the situation just explained, in which the target person is using a mobile station. It can likewise be used to monitor telephone calls which the target person makes via a stationary telephone. Furthermore, a stationary telephone can be used as the monitoring device. The invention thus provides a monitoring method which can be applied to all practically relevant call and monitoring situations.

The method according to the invention makes it possible to monitor a mobile subscriber without having any involvement in the radio transmission which takes place between the mobile subscriber's mobile station and a base transmitting/receiving station of the mobile communications network. This is a major advantage, since the signals interchanged between the mobile station and the base transmitting/receiving station are encrypted, and monitoring of these signals involves major complexity. If one also considers that coupling of the relaying device to the recording centre on the one hand and to the fixed network on the other hand can be carried out without any major technical complexity, then it becomes clear that the proposed method is also highly cost-effective.

In an advantageous development of the invention, a telephone number which is contained in the selected comparison data set and is allocated to the monitoring device is dialled by the relaying device in order to produce the communications link. The information given by the stored telephone number makes it possible for the relaying device to produce the connection directly to the person who needs to monitor the target person, so that the person carrying out the monitoring can monitor the telephone call without any significant time delay.

When the communications link is being produced between the relaying device and the monitoring device of the person who needs to do the monitoring, it is possible to access control data which are contained in the selected comparison data set. The control data can be produced specifically for each person who needs to do the monitoring, that is to say for each individual comparison data set, thus ensuring that calls are set up flexibly and in an individually optimized manner. Further control data contained in the comparison data set allow additional information to be transmitted to the monitoring device. Thus, for example, after producing the communications link, predetermined, individually produced text sequences can be played to the person who needs to do the monitoring, providing him with information about the target person to be monitored.

The information content of a telephone call can be stored in the recording centre by means of a digital recording device. If the useful signal supplied to the recording centre is an analogue signal, then the recording device can convert this signal into digital call data.

If the target person is a mobile subscriber, then the data set may contain, for example, the international mobile subscriber telephone number MSISDN, the international mobile radio set tag IMEI and/or the international mobile subscriber tag IMSI. One of the tags mentioned above may be used as the subscriber tag. Furthermore, a number of these tags can be used at the same time.

The relaying device may, for example, be connected to the recording centre via a local data network, also called a LAN. The recording centre sends the call data and the data set via this data network to the relaying device. Particularly fast data transmission is possible by using a LAN.

The interface between the relaying device and the fixed network may be an interface specified in accordance with the known ISDN Standard. The interface may be configured as an $S_0$ interface or, if more powerful communication is desired, as an $S_{2M}$ interface.

In a further advantageous development of the invention, once the communication link has been set up, the monitoring device emits an identification tag to the relaying device, which is compared with a corresponding comparison tag contained in the comparison data set. This makes it possible to prevent an unauthorized subscriber from being able to monitor the telephone call.

Such an identification tag is, for example, a personal identification number, also called a PIN number, which is transmitted using the DTMF method. The PIN number can advantageously be decoded at the interface between the relaying device and the fixed network.

According to a further aspect of the invention, a system is provided for monitoring telephone calls.

Further advantageous refinements of the invention are the subject matter of the dependent claims and of the following description.

The invention is explained in the following text with reference to an exemplary embodiment which is shown in the single FIGURE.

In this FIGURE, the invention is explained for the situation in which the target object to be monitored, that is to say, as a rule, the target person, is a mobile subscriber who is operating within a public mobile communications network (which is operated in accordance with the known GSM Standard) and who is being monitored by an authorized person who needs to do the monitoring, for example a criminal investigator, using a mobile station operating as a monitoring device. Since the design and the operation of the mobile communications network are known per se, the FIGURE illustrates only those components of the mobile communications network which are required for understanding of the invention. Furthermore, the following text describes the measures required for monitoring telephone calls only in the context relevant to the invention.

For this purpose, the FIGURE illustrates a situation in which the target person is communicating via a mobile station 10, also called the target station in the following text, with a call partner, who is not illustrated in the FIGURE. At the start of the telephone call to be monitored, the target station sends by radio to a base transmitting/receiving station 12 an information signal which is encrypted in accordance with the GSM Standard and contains a useful signal which essentially represents the information content of the telephone call. Signalling data are also transmitted with the useful signal, and are used in a known manner to control the switching processes required to set up the call. Since the useful signal transmitted in accordance with the GSM Standard is a digital signal, the term "call data" is also used in the following text for the useful signal.

The call data are decrypted in the base transmitting/receiving station 12, and are supplied to a mobile switching centre 14. From there, the call data (which represent the call information) and subscriber tags (which are combined to form a data set and allow the target person to be identified) are transmitted to a recording centre 20 on the transmission paths which are denoted by 16 and 18, but are not specified in more detail for the reasons mentioned above.

In addition to or instead of the international mobile subscriber telephone number, the data set may contain, for example, as subscriber tags, the international mobile radio set tag, IMEI for short, and/or the international mobile subscriber tag, IMSI for short. Furthermore, the data set may contain subscriber tags which indicate, for example, a target dialling number for call diversion, or a subscriber location identification.

The recording centre 20 contains a digital recording device 22, which records the received call data, and a controller 24, which associates the call data and the data set with one another. If the call data and the data set are associated with one another, then they are supplied to a memory device 25, and are stored together there.

The recording centre 20 is connected via a data link 26, for example a local data network LAN, to a relaying device 28, which is coupled via an interface 30 to a fixed network 32. The interface 30 of the relaying device 28 may be an interface specified in accordance with the ISDN Standard, or else an analogue a/b interface. A memory 34 in which comparison data sets are stored is provided in the relaying device 28. Each of these comparison data sets may be allocated to a target object, that is to say, as a rule, a target person who is to be monitored, and contains comparison tags corresponding to the subscriber tags, for example the international mobile subscriber telephone number of the mobile subscriber to be monitored. In addition, such a comparison data set contains tags for the persons who need to do the monitoring. Such a tag for the persons who need to do the monitoring may be, for example, the telephone number of a person who is entrusted with monitoring a specific target object, that is to say in the example according to the FIGURE, the international mobile subscriber telephone number of a mobile station 36 which is operating as a monitoring device. Finally, such a comparison data set contains control data which control the setting up of the call to the person who needs to do the monitoring, which process needs to be completed by the relaying device 28.

Once, after the start of the telephone call to be monitored, the call data and the data set have been supplied to the recording centre 20 and have been associated with one another there, the data set is sent via the data link 26 to the relaying device 28. There, the data set with the comparison data sets is checked for the subscriber tag matching the corresponding comparison tags. A number of subscriber tags may also be used for this comparison. If one of the comparison data sets is selected by this comparison, then the relaying device starts to set up a communications link to the person who needs to do the monitoring, who can be dialled by means of his own tag, which is contained in the comparison data set, for example a telephone number allocated to the person who needs to do the monitoring. If necessary, it is in this case possible to set the system up for more than one person who needs to do the monitoring, so that the information can also be transmitted to a number of such persons, independently of one another. A further mobile switching centre 38 and a further base transmitting/receiving station 40 may also be involved in the communications link in a manner which is known and will therefore not be explained in any more detail at this point, such a further switching centre 38 and transmitting/receiving station 40 being allocated to a radio cell in the mobile communications network, in which the monitoring station 36 is located at that time.

The relaying device 28 thus dials the telephone number, as indicated in the selected comparison data set, of the person who needs to do the monitoring. In the example according to the FIGURE, this is the mobile subscriber telephone number allocated to the mobile monitoring station 36. If corresponding control data are provided in the selected comparison data set, then, once the call has been set up, that is to say after producing the communications link between the relaying device 28 and the monitoring station 36, the person who needs to do the monitoring can be requested to identify himself by entering his PIN number, that is to say his personal identification number. As a rule, the PIN number is transmitted using the known DTMF method. The required decoding of the PIN number is preferably carried out directly at the interface 30. If the PIN number matches a corresponding entry in the selected comparison data set, then the relaying device 28 uses the communications link that has been set up to relay the recorded telephone call. For this purpose, the relaying device 28 requests the call data stored in the memory device 25 of the recording centre 20, and commences the relay at the start of the recorded telephone call.

The setting up of the communications link which has to be carried out by the relaying device 28 can be refined further by appropriate control data stored in the memory 34. Thus, for example, the relaying device 28 can be equipped with a repeat-dialling function so that, if the communications link is not made, the person needing to do the monitoring is dialled once again by the relaying device 28.

LIST OF REFERENCE SYMBOLS

10 Mobile station
12 Base transmitting/receiving station
14 Mobile switching centre
16 Transmission path
20 Recording centre
22 Recording device
24 Controller
25 Memory device
26 Data link
28 Relaying device
30 Interface
32 Fixed network
34 Memory
36 Mobile station
38 Mobile switching centre
40 Base transmitting/receiving station

What is claimed is:

1. Method for monitoring telephone calls comprising, in succession, the steps of:

a) supplying a useful signal which contains the call information of a telephone call, said call information being an actual conversation and a data set which contains at least one digital subscriber tag to a recording centre, b) storing the call information in the recording centre in the form of digital call data and the data set associated with such call data, c) supplying the data set to a relaying device which is coupled to a fixed network, and is compared there with comparison data sets which each contain at least one comparison tag, d) if the subscriber tag matches the corresponding comparison tag of a selected comparison data set, a communications link is established via a fixed network, between the relaying device and at least one monitoring device which is intended for monitoring the telephone call, e) supplying the call data stored in the recording centre to the relaying device, and f) the monitoring device is supplied by means of the relaying device via the communications link, with a relayed signal which contains the call information.

2. Method according to claim 1, characterized in that, in order to produce the communications link from the relaying device (28), a telephone number is dialed which is contained in the selected comparison data set and is allocated to the monitoring device (36).

3. Method according to claim 1, characterized in that the communications link is produced using control data which are contained in the selected comparison data set.

4. Method according to claim 1, characterized in that the call information of the telephone call is recorded by a digital recording device (22) which is contained in the recording centre (20).

5. Method according to claim 4, characterized in that the call data and the data set associated with such call data are stored in a memory device (25) which is contained in the recording centre.

6. Method according to claim 1, characterized in that a mobile station (36) is used as the monitoring device.

7. Method according to claim 1, characterized in that the data set contains the international mobile subscriber telephone number, the international mobile radio set tag and/or the international mobile subscriber tag.

8. Method according to claim 1, characterized in that the relaying device (28) is supplied with the call data and the data set via a local data network (26).

9. Method according to claim 1, characterized by an interface (30) between the relaying device (28) and the fixed network (32), which interface (30) is specified in accordance with the ISDN Standard.

10. Method according to claim 1, characterized in that the comparison data sets contain further control data for transmitting additional information to the monitoring device (36).

11. Method according to claim 1, characterized in that, once the communications link has been set up, the monitoring device (36) emits at least one identification tag to the relaying device (28), and this is compared with a corresponding comparison tag contained in the comparison data set.

12. Method according to claim 11, characterized in that the identification tag is transmitted, and is decoded at the interface (42), using the DTMF method.

13. The method as claimed in claim 1, wherein the monitoring device is a remote monitoring device.

14. The method as claimed in claim 1, wherein the step f) comprises establishing communication with the monitoring device via a wireless connection.

15. System for monitoring telephone calls, comprising:

a recording centre which receives a useful signal which contains the call information of a telephone call, said call information being an actual conversation, and a data set which contains at least one digital subscriber tag and stores the call information in the form of digital call data and the data set associated with such call data, and a relaying device which is coupled to the recording centre and to a fixed network which is designed in such a way that, successively:

a) the data set supplied to the relaying device from the recording centre can be compared with comparison data which each contain at least one comparison tag, b) if the subscriber tag matches the corresponding comparison tag of a selected comparison data set, a communications link is produced via the fixed network to at least one monitoring device which is intended for monitoring the telephone call, c) the call data stored in the recording centre can be received, and d) the monitoring device can be supplied via the communications link with a relaying signal which contains the call information.

16. System according to claim 15, characterized in that the recording centre (20) contains at least one digital recording device (22) for recording call information.

17. System according to claim 16, characterized in that the relaying device (28) has a memory (34) for storing the comparison data sets.

18. System according to claim 16, characterized in that the recoding centre (20) contains at least one memory device (25) for storing the call data and the data set associated with such call data.

19. System according to claim 18, characterized in that the relaying device (28) has a memory (34) for storing the comparison data sets.

20. System according to claim 15, characterized in that the recording centre (20) contains at least one memory device (25) for storing the call data and the data set associated with such call data.

21. System according to claim 15, characterized in that the monitoring device is a mobile station (36).

22. System according to claim 13, characterized by a means, which is arranged at an interface (30) between the relaying device (28) and the fixed network (32), for decoding an identification tag which is transmitted using the DTMF method and is emitted from the monitoring device (36) to the relaying device (28).

23. The method as claimed in claim 15, wherein the monitoring device is a remote monitoring device.

24. The method as claimed in claim 15, wherein the step d) comprises establishing communication with the monitoring device via a wireless connection.

* * * * *